United States Patent
Furler et al.

(10) Patent No.: US 12,540,075 B2
(45) Date of Patent: Feb. 3, 2026

(54) PROCESS FOR THE PRODUCTION OF SYNGAS

(71) Applicant: SYNHELION SA, Zurich (CH)

(72) Inventors: Philipp Furler, Herrliberg (CH);
Simon Ackermann, Oberengstringen (CH); Philipp Good, Zürich (CH);
Giorgio Mazzanti, Fiumicino (IT);
Lukas Geissbühler, Bern (CH); Mario Goddy Zuber, Zurich (CH)

(73) Assignee: SYNHELION AG, Zurich (CH)

( * ) Notice: Subject to any disclaimer, the term of this patent is extended or adjusted under 35 U.S.C. 154(b) by 697 days.

(21) Appl. No.: 17/782,037

(22) PCT Filed: Dec. 1, 2020

(86) PCT No.: PCT/EP2020/084095
§ 371 (c)(1),
(2) Date: Jun. 2, 2022

(87) PCT Pub. No.: WO2021/110667
PCT Pub. Date: Jun. 10, 2021

(65) Prior Publication Data
US 2023/0002225 A1  Jan. 5, 2023

(30) Foreign Application Priority Data
Dec. 3, 2019  (EP) .................... 19213318

(51) Int. Cl.
*C01B 3/40* (2006.01)
*B01J 8/00* (2006.01)
*B01J 8/06* (2006.01)
(52) U.S. Cl.
CPC ............ *C01B 3/40* (2013.01); *B01J 8/001* (2013.01); *B01J 8/065* (2013.01); *B01J 8/067* (2013.01);
(Continued)

(58) Field of Classification Search
CPC ............ C01B 3/40; C01B 2203/0233; C01B 2203/0238; C01B 2203/1011;
(Continued)

(56) References Cited

U.S. PATENT DOCUMENTS

| 10,427,138 | B1 | 10/2019 | Siriwardane | |
| 2016/0002034 | A1* | 1/2016 | Fan | B01J 8/12 252/373 |
| 2019/0144274 | A1* | 5/2019 | Marker | B01J 23/63 252/373 |

FOREIGN PATENT DOCUMENTS

| WO | 2012/167351 A1 | 12/2012 |
| WO | 2017/001987 A1 | 1/2017 |

OTHER PUBLICATIONS

Eun-Hyeok Yang et al., "Combined steam and $CO_2$ reforming of methane over $La_{1-x}Sr_xNiO_3$ perovskite oxides", Catalysis Today, Apr. 13, 2017, pp. 242-250, vol. 299.

(Continued)

*Primary Examiner* — Daniel C. McCracken
*Assistant Examiner* — Starfari Teshawn McClain
(74) *Attorney, Agent, or Firm* — Sughrue Mion, PLLC

(57) ABSTRACT

A process for the production of syngas comprising the steps of providing a feed gas comprising a hydrocarbon, carbon dioxide and optionally steam, contacting a flow of said feed gas with a metal oxide to form syngas, wherein the mole fraction of carbon dioxide or in the case the feed gas comprises steam, the sum of the mole fractions of carbon dioxide and steam, in the feed gas is between 0.3 and 0.7; and/or wherein the mole fraction of the hydrocarbon in the feed gas is between 0.3 to 0.5, wherein the feed gas is contacted with the metal oxide at a temperature of between 1050K and 1600K.

13 Claims, 1 Drawing Sheet

Figure 1A:
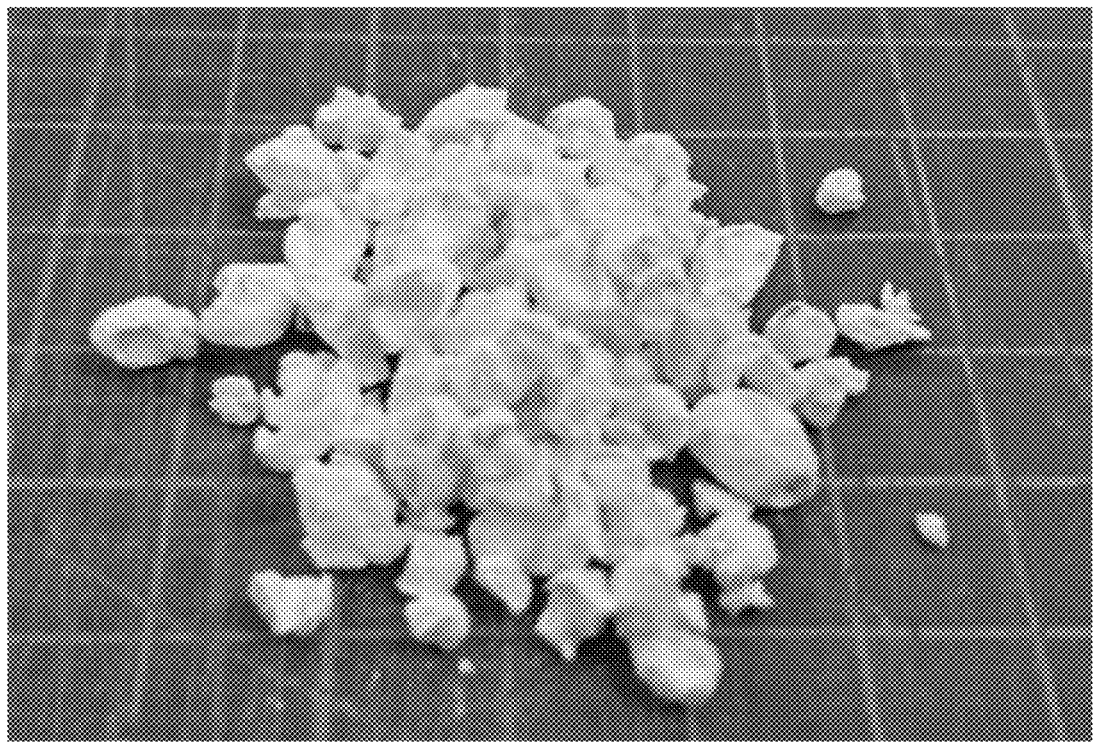

(52) U.S. Cl.
CPC ............... *B01J 2208/00548* (2013.01); *B01J 2208/00628* (2013.01); *B01J 2208/027* (2013.01); *C01B 2203/0233* (2013.01); *C01B 2203/0238* (2013.01); *C01B 2203/1011* (2013.01); *C01B 2203/1041* (2013.01); *C01B 2203/1241* (2013.01); *C01B 2203/169* (2013.01)

(58) Field of Classification Search
CPC .... C01B 2203/1041; C01B 2203/1241; C01B 2203/169; C01B 2203/0222; C01B 2203/1247; C01B 2203/1614; C01B 3/34; B01J 8/001; B01J 8/065; B01J 8/067; B01J 2208/00548; B01J 2208/00628; B01J 2208/027; B01J 2208/00212; B01J 2219/00094; B01J 2219/00164; B01J 2219/00186; B01J 2219/00198; B01J 2219/00231; B01J 2219/2445; B01J 8/02; B01J 19/0013; B01J 19/248; B01J 19/2485

See application file for complete search history.

(56) References Cited

OTHER PUBLICATIONS

Thitinat Sukonket et al., "Influence of the Catalyst Preparation Method, Surfactant Amount, and Steam on $CO_2$ Reforming of $CH_4$ over $5Ni/Ce_{0.6}Zr_{0.4}O_2$ Catalysts", Energy & Fuels, Mar. 17, 2011, pp. 864-877, vol. 25, No. 3.

Mahesh Muraleedharan Nair et al., "Structured catalysts for dry reforming of methane", New J. Chem., Jan. 1, 2016, pp. 4049-4060, vol. 40, No. 5.

International Search Report of PCT/EP2020/084095 dated Mar. 10, 2021 [PCT/ISA/210].

Written Opinion of PCT/EP2020/084095 dated Mar. 10, 2021 [PCT/ISA/237].

M. A. Muñoz, "Highly stable ceria-zirconia-yttria supported Ni catalysts for syngas production by CO2 reforming of methane," Applied Surface Science, Dec. 31, 2017, vol. 426, pp. 864-873 (17 pages total).

* cited by examiner

PROCESS FOR THE PRODUCTION OF SYNGAS

CROSS REFERENCE TO RELATED APPLICATIONS

This application is a National Stage of International Application No. PCT/EP2020/084095, filed Dec. 1, 2020, claiming priority to European Patent Application No. 19213318.9, filed Dec. 3, 2019.

TECHNICAL FIELD

The present invention relates to a process for the production of syngas, in particular via continuous partial oxidation of methane with $CO_2/H_2O$ using metal oxides.

PRIOR ART

Syngas, or synthesis gas, is a fuel gas mixture consisting primarily of hydrogen and carbon monoxide, which may be used for production of hydrogen, ammonia, methanol, and importantly, synthetic hydrocarbon fuels. Syngas can be produced from many sources, including natural gas, coal, biomass, or virtually any hydrocarbon feedstock and $H_2O/CO_2$. In particular, the production of syngas from renewable sources is a sought-after approach as it would be a sustainable alternative to fossil fuel derived liquid fuels.

The synthesis of liquid fuels, e.g. via Fischer-Tropsch process is however best achieved from syngas when the molar ratio of the carbon monoxide and the hydrogen in the syngas is about 1:2.

The constituents of syngas may be produced via multiple known processes, such as for example steam reforming, where steam is reacted at high temperature and pressure with methane in the presence of a metal nickel catalyst at industrial scale. However, steam reforming yields carbon monoxide and hydrogen in a 1:3 molar ratio and is thus poorly suited for the production of liquid fuels. Other processes, which are known but have not yet seen application at an industrial scale because of durability issues are for example dry reforming and mixed reforming.

Dry reforming is represented via the reaction $CO_2 + CH_4 \rightarrow 2 H_2 + 2 CO$, and thus yields carbon monoxide and hydrogen in a 1:1 molar ratio.

Mixed reforming is represented via the reaction $2/3 H_2O + 1/3 CO_2 + CH_4 \rightarrow 8/3 H_2 + 4/3 CO$, and thus yields carbon monoxide and hydrogen in a 2:1 molar ratio.

In both dry and mixed reforming, the feed gas of methane, carbon dioxide and eventually steam is contacted with a metal catalyst at elevated temperatures in order for the formation of syngas to occur. While in principle, dry or mixed reforming constitute attractive processes that may be used in an industrial setting to produce syngas having a more favorable ratio of hydrogen and carbon monoxide for the subsequent liquid fuel synthesis when compared to steam reforming, they both suffer from carbon depositions, which are the result from unwanted side-reactions within the reactor that inactivate and ultimately irreversibly damage the metal catalysts.

While it has been proposed to remove the carbon depositions from the catalyst via different measures, such measures are themselves accompanied by drawbacks, which hinder their adoption, especially at an industrial scale. For instance, it has been proposed to briefly burn off the carbon depositions by running the reactor on air or other gases, but the thermal stress generated on the catalyst in the reactor leads to sintering damage or phase changes in the material.

It is therefore desirable to provide a process for the production of syngas that on one hand provides a syngas having the desired ratio between hydrogen and carbon monoxide for liquid fuel synthesis and on the other hand which can be carried out robustly such as to allow its use at an industrial scale without penalty in conversion and selectivity.

"Reforming of Biogas over Co- and Cu-Promoted Ni $Al_2O_3$—$ZrO_2$ Nanocatalyst Synthesized via Sequential Impregnation Method"; M. Sharifi, M. Haghighi, F. Rahmani, N. Rahemi,; Journal of Renewable Energy and Environment, Vol. 1, No. 1 (December 2014) 53-63 discloses and reports on the effects of Cu and Co as promoters in Ni/$Al_2O_3$—$ZrO_2$ nanocatalyst in dry reforming of biogas (1:1 $CH_4$:$CO_2$), over the temperature range of 550 to 850° C., and total flow rate of 40 mL/min during 24 h.

"Hydrogen Production From Biogas Reforming: An Overview of Steam Reforming, Dry Reforming, Dual Reforming, and Tri-Reforming of Methane"; D. Pham Minh, T. J. Siang, D.-V. N. Vo, T. S. Phan, C. Ridart, A. Nzihou, D. Grouset; Elsevier Ltd. 2018 reports a state-of-the-art literature review on equilibrium thermodynamics, kinetic models and catalyst performance limitations for steam biogas reforming, dry reforming, dual reforming and tri-reforming of methane.

"Synthesis gas production from dry reforming of methane over Ni $Al_2O_3$ stabilized by $ZrO2$"; S. Therdthianwong, A. Therdthianwong, C. Siangchin; International Journal of Hydrogen Energy 2008, 33, 991-999 discloses and reports experimental results with a feedstock composition lying within the ranges as proposed in this patent, and it has been fed undiluted into a reactor at atmospheric pressure. However, temperatures were below 1050K and thus, conversions were below 70%. Furthermore, the reactive materials did not consist of nonstoichiometric ceria and significantly deactivated within a few hours.

"Catalytic dry reforming of methane over high surface area ceria"; N. Laosiripojana, S. Assabumrungrat; Appl. Catal. B Environ. 2005, 60, 107-116 discloses and reports on the effect of the ceria surface on the performance of the catalytic dry reforming of methane in a temperature range between 900 and 1000° C. However, the reported conversions are below 40%. The reported results were obtained using a feedstock gas that was highly diluted (mole fraction<0.3) in inert gas, which shifts favoured equilibrium thermodynamics, where high feed gas conversion and high syngas selectivity are obtained, towards significantly lower temperatures.

"A review of dry (CO2) reforming of methane over noble metal catalysts"; D. Pakhare, J. Spivey; R. Soc. Chem. 2014 reports a literature review on the problematics of catalyst deactivation due to carbon depositions with dry methane reforming and discusses catalyst performance improvements when using noble metals.

SUMMARY OF THE INVENTION

The present invention provides a process for the production of syngas which, on one hand, provides excellent hydrocarbon gas conversion and hydrogen/carbon monoxide selectivity and, on the other hand, provides a simplified process for the production of syngas to the extent that the tendency for carbon depositions during operation is diminished while allowing for the production of syngas having a more favorable ratio of hydrogen and carbon monoxide for the subsequent liquid fuel synthesis.

It is an object of the present invention to provide a process for the production of syngas comprising the steps of
a. providing a feed gas comprising, or consisting of, a hydrocarbon, carbon dioxide and optionally steam,
b. contacting a flow of said feed gas with a metal oxide to form syngas,
wherein the mole fraction of carbon dioxide or in the case the feed gas comprises steam, the sum of the mole fractions of carbon dioxide and steam in the feed gas is between 0.3 and 0.7, preferably between 0.5 and 0.7; and/or
wherein the mole fraction of the hydrocarbon in the feed gas is between 0.3 to 0.5, and
wherein the feed gas is contacted with the metal oxide at a temperature of between 1050K and 1600K.

It should be noted that if the feed gas is contacted with the metal oxide at a temperature below 1050K, the hydrocarbon gas conversion and/or the regenerating gas conversion drops significantly. The hydrocarbon gas conversion can be boosted at lower temperatures by feeding excess regenerating gas. However, the excess regenerating gas will stay unconverted and remain in the produced syngas.

When the process of the present invention is carried out using the feedstock gas having the claimed composition and mole fractions thereof under the claimed temperature conditions the process for the production of syngas relies on the metal oxide being locally cycled between a reduced non-stoichiometric state and an oxidized non-stoichiometric state. Because of the ability of the metal oxide to transport oxygen via its lattice structure, it is believed that the micro-fluctuations of the metal oxide between non-stoichiometric states are buffered by the metal oxide and that this buffering is also what allows to avoid carbon deposition by oxidation of the carbon towards carbon monoxide or carbon dioxide. It has been surprisingly observed that by simultaneously providing a hydrocarbon, carbon dioxide and optionally steam to the reaction chamber comprising the metal oxide, these advantages may be obtained.

It is to be noted that a part of the constituent hydrogen and/or carbon monoxide of the syngas is generated from the hydrocarbon gas comprised in the feed gas, which contacts the metal oxide in a first non-stoichiometric state $M_xO_{y-\alpha}$ such as to reduce said metal oxide in a first non-stoichiometric state $M_xO_{y-\alpha}$ towards a second non-stoichiometric state $M_xO_{y-\beta}$ and that a part of the constituent hydrogen and/or carbon monoxide of the syngas is generated from the carbon dioxide and/or steam, which contacts the metal oxide in the second non-stoichiometric state $M_xO_{y-\beta}$ such as to oxidize the metal oxide in the second non-stoichiometric state $M_xO_{y-\beta}$ towards the first non-stoichiometric state $M_xO_{y-\alpha}$ wherein the $\beta>\alpha$ and $\alpha>\beta$ and $\beta<y$.

It is understood that x and y are non-zero values and preferably are integers and M denominates metal and O denominates oxygen.

It is further an object of the present invention to provide a device for the production of syngas, configured to carry out the process according to any of the previous claims, comprising at least
a. a reaction chamber comprising a metal oxide,
b. a heat source capable of heating the reaction chamber and controlled by a heat source control device,
c. a first mass flow controller capable of controlling the inflow of hydrocarbon gas into the reaction chamber,
d. a second mass flow controller capable of controlling the inflow of regeneration gas into the reaction chamber,
wherein the first mass flow controller is configured to control the flow of hydrocarbon gas into the chamber comprising the metal oxide such as to enable the reduction of the metal oxide in a first non-stoichiometric state $M_xO_{y-\alpha}$ towards a second non-stoichiometric state $M_xO_{y-\beta}$,
wherein preferably the second mass flow controller is configured to control the flow of regenerating gas into the chamber comprising the metal oxide such as to enable the oxidation of the metal oxide in a second non-stoichiometric state $M_xO_{y-\beta}$ towards a first non-stoichiometric state $M_xO_{y-\alpha}$.

Further embodiments of the invention are laid down in the dependent claims.

Figure 1B:
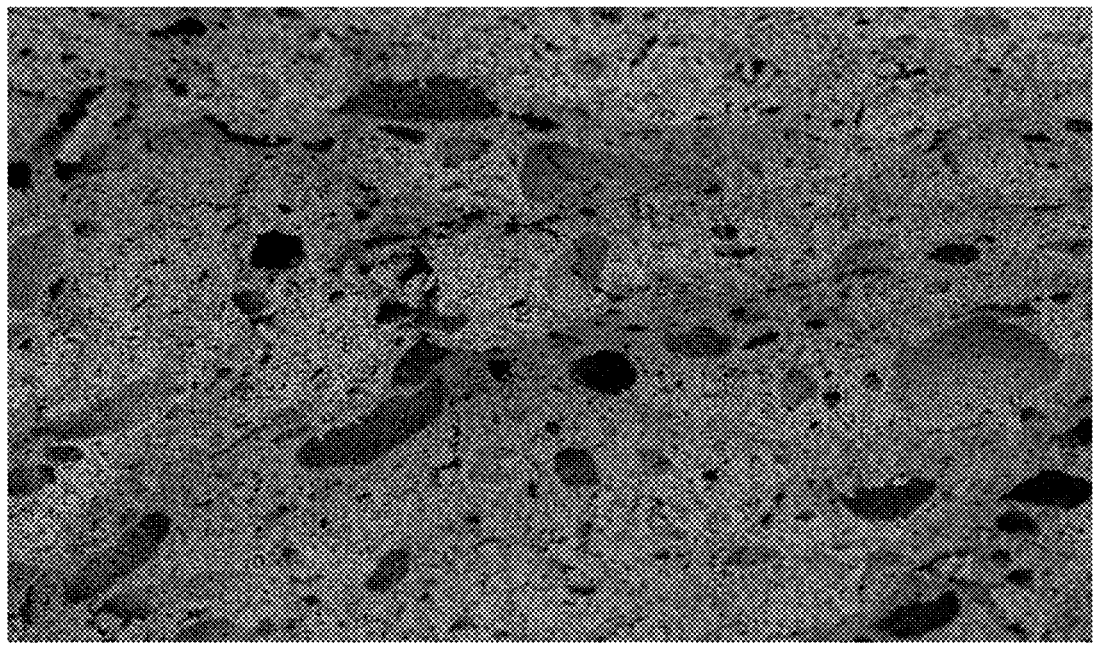

FIG. 1a shows a photograph of the metal oxide, in this case ceria in the form of crumbs, which may be used in the process according to the present invention FIG. 1b shows a SEM micrograph with 500× magnification, showing the interconnected pore network, having a μm-scale, of the surface of a ceria crumb, which may be used in the process according to the present invention.

DESCRIPTION OF PREFERRED EMBODIMENTS

It is an object of the present invention to provide a process for the production of syngas comprising the steps of
c. providing a feed gas comprising a hydrocarbon, carbon dioxide and optionally steam,
d. contacting a flow of said feed gas with a metal oxide to form syngas,
wherein the mole fraction of carbon dioxide or in the case the feed gas comprises steam, the sum of the mole fractions of carbon dioxide and steam in the feed gas is between 0.3 and 0.7; and/or
wherein the mole fraction of the hydrocarbon in the feed gas is between 0.3 to 0.5,
wherein the feed gas is contacted with the metal oxide at a temperature of between 1050K and 1600K.

The syngas which may be produced via the above process generally comprises at least carbon monoxide and hydrogen, preferably in a molar ratio between hydrogen and carbon monoxide of about between 1:1 and 2:1, in contrast to steam reforming which yields a molar ratio of 3:1. The syngas which may be produced via the above process is thus more suitable for further processing via Fischer-Tropsch or methanol synthesis in that the molar ratio between carbon monoxide and hydrogen is less than 1:3 or 1:2.5 and preferably between 1:1 to 2:1.

In a preferred embodiment of the process for the production of syngas according to the invention, the hydrocarbon comprises or essentially consists of methane, ethane, propane, butane, pentane or mixtures thereof. In a more preferred embodiment of the process for the production of syngas according to the invention, the hydrocarbon comprises at least 90 weight percent methane, more preferably at least 95 weight percent methane, most preferably at least 98 weight percent methane, where the remaining weight percent are made up of other hydrocarbons such as ethane, propane, butane or pentane and mixtures thereof.

It will be apparent that the hydrocarbon in the feed gas may be of fossil and non-fossil origin. For example, non-fossil gases which may be used for the feed gas may be obtained by fermentation of biomass, gasification of carbonous material, methanation of $H_2$ and $CO_2$ to $CH_4$ and $H_2O$, whereas fossil gases which may be used for the feed gas may be natural gas.

Using a non-fossil hydrocarbon gas such as for example biogas for the feed gas renders the syngas produced according to the method of the invention $CO_2$-neutral.

In a preferred embodiment of the process for the production of syngas according to the invention, the feed gas does not comprise more than 1 weight percent of a noble gas such as for example argon or helium, or of nitrogen.

In a preferred embodiment of the process for the production of syngas according to the invention, the feed gas does not comprise more than 5 weight percent, preferably more than 2 weight percent and even more preferably 1 weight percent of a gas that is not a hydrocarbon, steam or carbon dioxide.

In a preferred embodiment of the process for the production of syngas according to the invention, the feed gas comprises steam and preferably the mole fraction of steam in the feed gas is between 0.01 and 0.6.

In a preferred embodiment of the process for the production of syngas according to the invention, the process is carried out at a temperature in the range of 1050K to 1600K.

In a preferred embodiment of the process for the production of syngas according to the invention, the feed gas is obtained by the addition of carbon dioxide, steam, or steam and carbon dioxide to a biogas, i.e. the feed gas is a mixture of a biogas with carbon dioxide, steam, or carbon dioxide and steam.

In a preferred embodiment of the process for the production of syngas according to the invention, the feed gas is obtained by the addition of carbon dioxide, steam, or steam and carbon dioxide to a biogas essentially free of hydrogen sulphide, i.e. the feed gas is a mixture of a biogas essentially free of hydrogen sulphide with carbon dioxide, steam, or carbon dioxide and steam. While in general, the feedgas, in particular when sourced from renewable sources such as biological processes resulting in biogas, may comprise unwanted impurities such as for example hydrogen sulphide ($H_2S$) or other sulphur compounds, nitrogen ($N_2$) or ammonia ($NH_3$), which may, under certain circumstances, negatively affect the process of the present invention, it is preferable that they are removed before introducing the feedgas into the process according to the invention.

In a preferred embodiment of the process for the production of syngas according to the invention, the mole fraction of carbon dioxide or in the case the feed gas comprises steam, the sum of the mole fractions of carbon dioxide and steam in the feed gas is preferably larger than the mole fraction of the hydrocarbon. In particular, the ratio between the mole fraction of carbon dioxide or in the case the feed gas comprises steam, the ratio between the sum of the mole fractions of carbon dioxide and steam in the feed gas is at least 1 or preferably between 1 and 2.

In a preferred embodiment of the process for the production of syngas according to the invention, the feed gas is a biogas, in particular a biogas essentially free of hydrogen sulphide.

In a preferred embodiment of the process for the production of syngas according to the invention, the feed gas is obtained by the addition of carbon dioxide, steam or carbon dioxide and steam to a natural gas i.e. the feed gas is a mixture of a natural gas with carbon dioxide, steam, or carbon dioxide and steam.

In a preferred embodiment of the process for the production of syngas according to the invention, the feed gas is obtained by the addition of carbon dioxide, steam or carbon dioxide and steam to a natural gas essentially free of hydrogen sulphide i.e. the feed gas is a mixture of a natural gas essentially free of hydrogen sulphide with carbon dioxide, steam, or carbon dioxide and steam.

In a preferred embodiment of the process for the production of syngas according to the invention, the metal oxide is in the form of a porous structure, in particular an open-cell foam structure.

In a preferred embodiment of the process for the production of syngas according to the invention, the feed gas has a pressure from 1 bar to 20 bar.

In a preferred embodiment of the process for the production of syngas according to the invention, the metal oxide is chosen from ceria and solid solutions of ceria ($Ce_{1-x}M_xO_2$) where M can be Zr, Hf, Sm, La, Sc, from metal oxides having a perovskite structure $ABO_3$ where A is chosen from Sr, Ca, Ba, La and B is chosen from Mn, Fe, Ti, Co, Al, such as for example $CaTiO_3$, from iron oxides such as iron(II,III) oxide and mixed ferrites $M_xFe_{3-x}O_4$ where M is preferably chosen from Zn (Zn-ferrite), Co (Co-ferrite), Ni (Ni-ferrite), Mn (Mn-ferrite), from tungsten trioxide ($WO_3$), from stannic oxide ($SnO_2$), and from ceria ($CeO_2$) and solid solutions of ceria ($Ce_{1-x}M_xO_2$) where M can be Zr, Hf, Sm, La, Sc such as with Zr (for example $Ce_{0.85}Zr_{0.15}O_2$) and Hf ($Ce_{1-x}Hf_xO_2$), preferably is ceria or ceria and a solid solution of ceria ($Ce_{1-x}M_xO_2$), where M can be Zr, Hf, Sm, La, Sc.

In a preferred embodiment of the process for the production of syngas according to the invention, the metal oxide is in the form of a structure adapted to increase contact area between the feed gas and/or to increase mass flow of the feed gas across the structure.

Exemplary structures may for example be honeycomb structures, particle bed structures such as packed bed structures or fluidized bed structures, or porous structures such as open-cell foam.

It is further understood that within the process for the production of syngas according to the invention, the metal oxide is in solid form.

In a preferred embodiment of the process for the production of syngas according to the invention, the metal oxide may be in the form of a packed bed of irregular particles of metal oxide such as crumbs or pebbles. Crumbs are irregularly shaped particles having a particle size between 0.05 and 10 mm (see FIG. 1a). Each single crumb exhibits an interconnected pore network, whose pores are preferably in the m-scale (see FIG. 1b), and has a porosity in the range of 0.2 to 0.6 and a specific surface area in the range of 0.2 to 20 $m^2/g$.

When loaded into a reactor, the overall bed porosity of the metal oxide (bed porosity superposed with the m-scale crumb porosity) is in the range of 0.5 to 0.9.

The specific surface area is defined as the surface area related to the total bulk volume (solid and void) of the metal oxide and is measured with BET and mercury intrusion porosimetry.

In a preferred embodiment of the process for the production of syngas according to the invention, the metal oxide has low porosity and high specific surface area. Preferably, the metal oxide has a porosity $\varepsilon$ of less than or equal to 0.9, preferably of about 0.4 to about 0.9, more preferably of about 0.75 to about 0.9 when measured via BET and/or a specific surface area of more than 20 000 $m^{-1}$, preferably of about 20 000 to about 30 000 000 $m^{-1}$, more preferably of about 500 000 to about 10 000 000 $m^{-1}$ when measured according to the below equation.

The porosity is determined by the reactor volume, V, the mass of the reactive material, m, and the solid phase density of the metal oxide, $\rho$, according to the following equation:

$$\varepsilon = 1 - \frac{m}{V \cdot \rho}$$

The specific surface area is determined by the surface area related to the total bulk volume (solid and void) and measured via BET (Brunauer-Emmett-Teller) by probing with nitrogen as gaseous adsorbate.

In a preferred embodiment of the process for the production of syngas according to the invention, the metal oxide has a flow permeability K of 500 Darcy's or more, preferably of about 500 to about $10^9$ Darcy's, more preferably of about $10^7$ to about $10^9$ Darcy's when measured according to the below method, which enables the process according to the present invention to be run at higher mass rates. 1 Darcy=$9.86923 \cdot 10^{-13}$ m$^2$ In the case of open-cell foam-type structures, the flow permeability is determined by applying Darcy's law on the pressure drop of a flow throughout the structure. The pressure drop is determined by applying direct pore-level simulations of the mass and momentum conservation equation on the exact 3D digital geometry of the porous structure, obtained using high-resolution tomography.

In the case of packed beds the permeability is calculated with the porosity, ε, and the particle diameter, d, by applying the Kozeny-Carman equation:

$$K = \frac{\varepsilon^3 \cdot d^2}{(1-\varepsilon)^2}$$

In the case where the metal oxide is ceria or a solid solution of ceria, the metal oxide preferably has a porosity of less than 0.9, and/or a specific surface area of more than 20 000 m$^{-1}$.

The feed gas useful in the present invention comprises a hydrocarbon gas, carbon dioxide and optionally steam, which feed gas is preferably in the form of a mixture of hydrocarbon gas, carbon dioxide and optionally steam. In order to provide the feed gas in the form of a mixture of hydrocarbon gas, carbon dioxide and optionally steam, the constituents of the feed gas may be provided in the form of a pre-mix or may be separately introduced into the reaction chamber comprising a metal oxide such that the vortex created by the inflow of the constituents of hydrocarbon gas, carbon dioxide and optionally steam provides for in-situ mixing.

The feed gas useful in the present invention may be obtained by de novo mixing the constituents of the feed gas or by addition of one or more of the constituents of the feed gas to an existing single gas such as methane issued from a methanation process or an existing mixture of two or more of the constituents of the feed gas.

Suitable existing mixtures of two or more of the constituents of the feed gas are for example natural gas or biogas.

In the case where natural gas is used as existing mixture of two or more of the constituents of the feed gas, the feed gas is obtained by the addition of steam and/or carbon dioxide to the natural gas, until the desired mole fractions of the constituents of the feed gas are obtained. Natural gas contains little carbon dioxide and steam and thus rather large amounts of carbon dioxide and/or steam are added to the natural gas to provide a suitable feed gas.

In the case where biogas is used as existing mixture of two or more of the constituents of the feed gas, the feed gas is obtained by the addition of steam and/or carbon dioxide to the biogas, until the desired mole fractions of the constituents of the feed gas are obtained. Biogas contains, in addition to methane in excess of a mole fraction 0.5, a high amount of carbon dioxide and lower amounts, if any, of steam and thus either a small amount of carbon dioxide and steam, or solely steam, are/is added to the biogas to provide a suitable feed gas having the required methane, carbon dioxide and steam mole fractions. In a preferred embodiment, only steam, i.e. no carbon dioxide, is added to the biogas to provide for a suitable feed gas. This means that, in the process according to the present invention, the feed gas may be provided by addition of steam and carbon dioxide or even only steam to the biogas as-is without the need for upgrading of the biogas, i.e. without a treatment for increasing the methane content in the biogas.

It is understood that biogas, even when it has not been upgraded, is preferably desulphurized biogas, i.e. biogas treated to remove at least sulphur compounds such as hydrogen sulphide or treated to essentially remove sulphur compounds such as hydrogen sulphide and at least one or more of nitrogen, oxygen or hydrogen.

In a preferred embodiment of the process for the production of syngas according to the invention, the hydrocarbon gas comprises or consists of methane, ethane, propane, butane, pentane or mixtures thereof.

In a more preferred embodiment, the hydrocarbon is methane or a mixture of methane with one or more of ethane, propane, butane or pentane. Such mixtures may be found in natural gas, which comprises methane in a mole fraction of 0.9 or more in combination with one or more of ethane, propane, butane or pentane.

In a preferred embodiment of the process for the production of syngas according to the invention, the mole fraction of the hydrocarbon gas in the feed gas is between 0.3 to 0.5, more preferably between 0.45 and 0.5.

In a preferred embodiment of the process for the production of syngas according to the invention, the hydrocarbon gas has a partial pressure of about 0.3 bar when the pressure of the feed gas is about 1 bar or a partial pressure of about 5 bar when the feed gas pressure is about 10 bar.

In a preferred embodiment of the process for the production of syngas according to the invention, and in the case the feed gas comprises steam, the sum of the mole fractions of carbon dioxide and steam in the feed gas is between 0.3, or 0.31, and 0.7, preferably between 0.5, or 0.51, and 0.7 and more preferably between 0.5, or 0.51, and 0.55.

In a preferred embodiment of the process for the production of syngas according to the invention, the mole fraction of carbon dioxide in the feed gas is between 0.3 and 0.7 and more preferably is between 0.5 and 0.7 when the feed gas comprises no steam, more preferably between 0.5 and 0.55.

In a preferred embodiment of the process for the production of syngas according to the invention, in the case the feed gas comprises no steam, the mole fraction of carbon dioxide, in the feed gas, is between 0.3 and 0.7 and more preferably is between 0.5 and 0.7, more preferably between 0.5 and 0.55.

In a preferred embodiment of the process for the production of syngas according to the invention, in the case the feed gas comprises steam, the mole fraction of steam, in the feed gas, is between 0.01 and 0.6, preferably between 0.01 and 0.15 and more preferably between 0.01 and 0.1.

In a preferred embodiment of the process for the production of syngas according to the invention, in the case the feed gas comprises steam, the sum of the mole fractions of carbon dioxide and steam, in the feed gas, is between 0.5, or 0.51, and 0.7; and the mole fraction of carbon dioxide is between 0.5, or 0.51, and 0.55.

In a preferred embodiment of the process for the production of syngas according to the invention, in the case the feed gas comprises no steam, the mole fraction of carbon dioxide, in the feed gas, is between 0.5 and 0.7; and is preferably between 0.5 and 0.55.

In a preferred embodiment of the process for the production of syngas according to the invention, the feed gas is a "neat" biogas, in particular a biogas that has not undergone upgrading. This means that after its release and collection from the biomass, the biogas has not been treated to alter the content of methane, carbon dioxide or steam and is used with the composition of methane, carbon dioxide and steam it had when it was produced. In a preferred embodiment of the process for the production of syngas according to the invention, the feed gas is a biogas that has not undergone upgrading and that has been treated to at least remove sulphur compounds such as hydrogen sulphide or is a biogas that has that has not undergone upgrading and that has been treated to essentially remove sulphur compounds such as hydrogen sulphide and at least one or more of nitrogen, oxygen or hydrogen. This means that after its release and collection from the biomass, the gas has not been treated to alter the content of methane, carbon dioxide or steam and is used as-is after being desulphurized.

In the context of the present invention, the term "neat biogas" refers, in terms of its composition, to a biogas comprising carbon dioxide, steam and methane, wherein the mole fraction of carbon dioxide is between 0.25 and 0.54, and/or the mole fraction of steam is up to 0.15 or between 0.1 and 0.15 and/or the mole fraction of methane is between 0.45 and 0.5.

It is understood that not all biogas has the required mole fractions in terms of hydrocarbon and carbon dioxide and steam to be used as-is, and therefore, as described above, mole fractions of more than 0.5 with respect to the hydrocarbon may be adjusted by addition of steam, carbon dioxide or a mixture of both until a suitable feed gas is obtained.

In a preferred embodiment of the process for the production of syngas according to the invention, the feed gas has a pressure of about at least 1 bar, and preferably is pressurized, more preferably has a pressure of from 2 bar to 20 bar, more preferably of from 2 bar to 10 bar or from 10 bar to 20 bar. While the process according to the present invention may be carried out with feed gas such as biogas at atmospheric pressure, it is advantageous to compress the feed gas as the compression of the feed gas is less work intensive than the compression of the syngas.

In a preferred embodiment of the process for the production of syngas according to the invention, the metal oxides capable of non-stoichiometry can be chosen from metal oxides having a perovskite structure $ABO_3$ where A is chosen from Sr, Ca, Ba, La and B is chosen from Mn, Fe, Ti, Co, Al, such as for example $CaTiO_3$, from iron oxides such as iron (II,III) oxide and mixed ferrites $M_xFe_{3-x}O_4$ where M is preferably chosen from Zn (Zn-ferrite), Co (Co-ferrite), Ni (Ni-ferrite), Mn (Mn-ferrite), from tungsten trioxide ($WO_3$), from stannic oxide ($SnO_2$), and from ceria ($CeO_2$) and solid solutions of ceria ($Ce_{1-x}M_xO_2$) where M can be Zr, Hf, Sm, La, Sc such as with Zr (for example $Ce_{0.85}Zr_{0.15}O_2$) and Hf ($Ce_{1-x}Hf_xO_2$), preferably from ceria and solid solutions of ceria ($Ce_{1-x}M_xO_2$).

In particular, among metal oxides, ceria and solid solutions of ceria offer high oxygen exchange capacities, fast oxygen transport across its lattice as well as fast kinetics during both redox steps. It is understood that each of the above metal oxides capable of non-stoichiometry will have a first non-stoichiometric state $M_xO_{y-\alpha}$ and a second non-stoichiometric state $M_xO_{y-\beta}$ and corresponding range between $\alpha$ and $\beta$ in which the syngas may be produced with the desired selectivity and conversion. In the following, data is provided for ceria, solid solutions of ceria with Zr and nickel-ferrite. It is understood that determining the optimal values for other metal oxides in the context of the present invention lies within the skill of the person skilled in the art.

In a preferred embodiment of the process for the production of syngas according to the invention and in the case where the metal oxide is ceria ($CeO_{2-\alpha}/CeO_{2-\beta}$), $\beta-\alpha$ is in the range of 0.01 and 0.2 and can preferably be in the range of 0.02 to 0.05 or in the range of 0.05 to 0.2. In another preferred embodiment, $\beta-\alpha$ is in the range of 0.1 and 0.2.

In a preferred embodiment of the process for the production of syngas according to the invention, where the metal oxide is ceria and $\beta-\alpha$ is in the range of 0.1 and 0.2, and the feed gas is contacted with the ceria at a temperature of between 1050K and 1600K by providing a feed gas wherein the mole fraction of carbon dioxide or carbon dioxide and steam is between 0.5 and 0.7, more preferably between 0.5 and 0.55, and the mole fraction of the hydrocarbon in the feed gas is between 0.3 to 0.5, preferably between 0.45 and 0.5.

In a preferred embodiment of the process for the production of syngas according to the invention and in the case where the metal oxide is ceria ($CeO_{2-\alpha}/CeO_{2-\beta}$), $\beta$ is in 0.05 or more; or in the range of 0.10 and 0.25, and $\alpha$ is in the range of 0.05 or more, or in the range of 0.05 and 0.2, preferably R is in the range of 0.1 and 0.2 and $\alpha$ is in the range of 0.1 and 0.2.

Exemplary values for ceria are for example when $\alpha$ is about 0.05 and $\beta$ is about 0.25; or $\alpha$ is about 0.1 and $\beta$ is about 0.2; or $\alpha$ is about 0.12 and $\beta$ is about 0.16.

While higher syngas yield can be achieved by larger differences between $\beta$ and $\alpha$, it is understood that $\beta$ should nonetheless be chosen such that the non-stoichiometry does not damage the metal oxide or its ability to carry out the process. For instance, in the case of ceria, it is not preferred to allow for values of $\beta$ exceeding 0.25 because side-products such as solid carbon occur due to a phase change in the ceria lattice. On the other hand, it is also not preferred to allow for values of $\alpha$ below 0.05 because side-products such as steam or carbon dioxide occur when a hydrocarbon gas such as methane is oxidized. In addition, in the case of ceria, when $\alpha$ is about 0.1 or more, another side-reaction where non-stoichiometric ceria reacts with the generated hydrogen and/or carbon monoxide to yield steam and carbon dioxide can be reduced.

In a preferred embodiment of the process for the production of syngas according to the invention and in the case where the metal oxide is a nickel-ferrite ($NiFe_2O_{4-\alpha}/NiFe_2O_{4-\beta}$), $\beta-\alpha$ is in the range of 0.01 and 0.2 and can preferably be in the range of 0.02 to 0.05 or in the range of 0.05 to 0.2.

In a preferred embodiment of the process for the production of syngas according to the invention and in the case where the metal oxide is a nickel-ferrite ($NiFe_2O_4$), $\beta$ is in 0.3 or more; or in the range of 0.3 and 0.5, and $\alpha$ is in the range of 0.3 or more, or in the range of 0.3 and 0.5.

In a preferred embodiment of the process for the production of syngas according to the invention and in the case where the metal oxide is a solid solution of ceria and zirconia such as $Ce_{0.85}Zr_{0.15}O_2$ ($Ce_{0.85}Zr_{0.15}O_{2-\alpha}/Ce_{0.85}Zr_{0.15}O_{2-\beta}$), $\beta-\alpha$ is in the range of 0.01 and 0.1 and can preferably be in the range of 0.02 to 0.05 or in the range of 0.05 to 0.1. Solid solutions of ceria and zirconia exhibit slightly lower oxygen affinity.

In a preferred embodiment of the process for the production of syngas according to the invention and in the case where the metal oxide is a solid solution of ceria and zirconia such as $Ce_{0.85}Zr_{0.15}O_2(Ce_{0.85}Zr_{0.15}O_{2-\alpha}/Ce_{0.85}Zr_{0.15}O_{2-\beta})$, $\beta$ is 0.1 or more; or in the range of 0.10 and 0.2, and $\alpha$ is in the range of 0.1 or more, or in the range of 0.1 and 0.2.

In a preferred embodiment of the process for the production of syngas according to the invention and in the case where the metal oxide is ceria, the process is carried out at a temperature in the range of 1050K to 1600K, preferably in the range of 1200K to 1400K.

It is understood that in general, the process may not be carried out at a temperature that damages the metal oxide or that leads to deterioration of its ability to undergo the redox cycling necessary to the production of syngas.

In a preferred embodiment of the process for the production of syngas according to the invention and in the case where the metal oxide is nickel ferrite, the process is carried out at a temperature in the range of 1050K to 1600K.

In a preferred embodiment of the process for the production of syngas according to the invention and in the case where the metal oxide is a solid solution of ceria and zirconia, the process is carried out at a temperature in the range of 1050K to 1600K.

In a preferred embodiment of the process for the production of syngas according to the invention, the metal oxide is in the form of a porous structure, in particular an open-cell foam structure. Open cell foam provides a good balance between contact area between metal oxide and hydrocarbon gas and mass flow permeability and heat transfer.

In a preferred embodiment of the process for the production of syngas according to the invention, the metal oxide is in the form of a porous structure allowing for a gas mass flow rate in excess of 1 ml/min/g.

It is further an object of the present invention to provide a device for the production of syngas, configured to carry out the process according to the process for the production of syngas according to the invention, comprising at least
  a. a reaction chamber comprising a metal oxide,
  b. a heat source capable of heating and maintaining the reaction chamber at a temperature of from 1050K to 1600K, and controlled by a heat source control device,
  c. a first mass flow controller capable of controlling the inflow of feed gas into the reaction chamber,
  d. optionally an analytic device capable of determining the mole fraction of methane, carbon dioxide and steam in the inflow of feed gas and capable of communicating with a second mass flow controller capable of controlling the addition of either carbon dioxide, steam or both to the flow of feed gas such as to adjust the mole fraction of methane, carbon dioxide and steam in the feed gas towards a mole fraction of carbon dioxide in the feed gas between 0.1 and 0.7 and/or a mole fraction of the hydrocarbon in the feed gas between 0.3 to 0.5 when the mole fraction of carbon dioxide in the feed gas is not between 0.1 and 0.7 and/or a mole fraction of the hydrocarbon in the feed gas is not between 0.3 to 0.5, wherein preferably the mass flow controller is configured to control the flow of feed gas into the chamber comprising the metal oxide such as to enable the simultaneous reduction of the metal oxide in a first non-stoichiometric state $M_xO_{y-\alpha}$ towards a second non-stoichiometric state $M_xO_{y-\beta}$ and the oxidation of the metal oxide in a second non-stoichiometric state $M_xO_{y-\beta}$ towards a first non-stoichiometric state $M_xO_{y-\alpha}$.

In a preferred embodiment of the device according to the present invention, the mass controller is configured to control the flow of hydrocarbon gas/regeneration gas into the chamber comprising the metal oxide such that $\beta-\alpha$ is in the range of 0.01 and 0.5, more preferably of 0.1 to 0.2.

In a preferred embodiment of the device according to the present invention, the reaction chamber comprises a tubular reactor chamber, preferably having a diameter of from about 0.02 m to about 0.2 m and/or a length of at least 5 times the diameter.

In a preferred embodiment of the device according to the present invention, the reaction chamber is delimited by a tubular structure having an inner diameter corresponding to the diameter of the reaction chamber. The tubular structure may be made from a material such as a metal or metal alloy that has a melting point of from about 1050K.

In a preferred embodiment of the device according to the present invention, the heat source capable of heating the reaction chamber may be a combustion device such as a burner in which mainly the exhaust gases resulting from the combustion of a fuel are used as heat transfer fluid or may be a solar-powered device such as a solar receiver in which a circulating heat transfer fluid such as for example steam, carbon dioxide, air or radiating gases are used as heat transfer fluid. The reaction chamber may thus be heated by thermally contacting the heat transfer fluid with the reaction chamber but without introducing the heat transfer fluid into the reaction chamber.

In a preferred embodiment of the device according to the present invention, the heat transfer fluid emanating from the heat source is guided along the longitudinal dimension of the tubular reaction chamber such as to transfer thermal energy into the reaction chamber across the tubular structure delimiting the reaction chamber.

In a preferred embodiment of the device according to the present invention, the flow of the heat transfer fluid along the longitudinal reaction chamber flows in opposite direction of the hydrocarbon gas and/or the regeneration gas inflow in the reaction chamber such as to increase the transfer of thermal energy from the heat transfer fluid to the hydrocarbon gas and/or the regeneration gas.

In a preferred embodiment of the device according to the present invention, the device further comprises a second analytic device capable of determining the composition of the syngas with respect to the chemical composition of its constituents and/or the amount of its constituents, and wherein the inflow of feed gas controlled by the first mass flow controller is adjusted according to the chemical composition of the constituents and/or the amount of its constituents determined by the second analytic device by the addition of steam and/or carbon dioxide controlled by the second mass flow.

The invention claimed is:

1. A process for the production of syngas comprising the steps of
  a. providing a feed gas consisting of a hydrocarbon, carbon dioxide, and steam,
  b. contacting a flow of said feed gas with ceria ($CeO_2$) to form syngas, wherein
  the sum of the mole fractions of carbon dioxide and steam, in the feed gas, is between 0.5 and 0.7; and wherein the mole fraction of carbon dioxide in the feed gas is 0.1 and 0.55 and the mole fraction of steam in the feed gas is between 0.15 and 0.6, wherein the mole fraction of the hydrocarbon in the feed gas is between 0.3 to 0.5, wherein the feed gas is contacted with the metal oxide at a temperature of between 1200 K and 1400 K and wherein the feed gas has a pressure of from 2 bar to 20 bar, wherein the flow of feed gas simultaneously reduces the ceria in a first non-stoichiometric state $CeO_{2-\alpha}$ towards a second non-stoichiometric state $CeO_{2-\beta}$ and oxidizes the ceria in a second non-stoichiometric state $CeO_{2-\beta}$ towards a first non-stoichiometric state $Ceo_{2-\alpha}$, wherein $\beta$ is in the range of 0.10 and 0.25, and $\alpha$ is in the range of 0.05 and 0.2 and $\beta-\alpha$ is in the range of 0.01 and 0.2.

2. The process for the production of syngas according claim 1, wherein the hydrocarbon comprises or consists of methane, ethane, propane, butane, pentane or mixtures thereof.

3. The process for the production of syngas according to claim 1, wherein the feed gas is obtained by the addition of carbon dioxide, steam, or steam and carbon dioxide to a biogas.

4. The process for the production of syngas according to claim 1, wherein the feed gas is a biogas.

5. The process for the production of syngas according to claim 1, wherein the feed gas is obtained by the addition of carbon dioxide, steam, or steam and carbon dioxide to a natural gas.

6. The process for the production of syngas according to claim 1, wherein the metal oxide is in the form of a packed bed of irregular particles of metal oxide.

7. The process for the production of syngas according to claim 1, wherein the mole fraction of carbon dioxide in the feed gas is 0.25 and 0.45 and the mole fraction of steam in the feed gas is between 0.15 and 0.45.

8. A device for the production of syngas, configured to carry out the process according to claim 1, comprising at least
   a. a reaction chamber comprising ceria ($CeO_2$),
   b. a heat source capable of heating and maintaining the reaction chamber at a temperature of from 1200 K to 1400 K, and controlled by a heat source control device,
   c. a first mass flow controller capable of controlling the mass inflow of feed gas into the reaction chamber, and controlled by a first mass flow controller control device,
   d. an analytic device capable of determining the mole fraction of methane, carbon dioxide and steam in the inflow of feed gas and capable of communicating with, and controlling, a second mass flow controller capable of controlling the addition of either carbon dioxide, steam or both to the flow of feed gas such as to adjust the mole fraction of hydrocarbon, carbon dioxide and steam in the feed gas towards a mole fraction of carbon dioxide and steam, in the feed gas of between 0.5 and 0.7 and towards a mole fraction of the hydrocarbon in the feed gas of between 0.3 to 0.5 when the mole fraction of carbon dioxide and steam, in the feed gas is not between 0.5 and 0.7 or when the mole fraction of the hydrocarbon in the feed gas is not between 0.3 to 0.5, such as to adjust the mole fraction of carbon dioxide in the feed gas towards a mole fraction of 0.1 and 0.55 and the mole fraction of steam in the feed gas towards a mole fraction of 0.15 and 0.6, when the mole fraction of the carbon dioxide in the feed gas is not between 0.1 to 0.55 when the mole fraction of the steam in the feed gas is not between 0.15 to 0.6.

9. The device for the production of syngas according to claim 8, wherein the reaction chamber comprises a tubular reactor chamber.

10. The device for the production of syngas according to claim 8, wherein the reaction chamber is delimited by a tubular structure having an inner diameter corresponding to the diameter of the reaction chamber.

11. The device for the production of syngas according to claim 10, wherein a heat transfer fluid emanating from the heat source is guided along the longitudinal dimension of the tubular reaction chamber such as to transfer thermal energy into the reaction chamber across the tubular structure delimiting the reaction chamber.

12. The process for the production of syngas according to claim 1, wherein the mole fraction of the hydrocarbon in the feed gas is between 0.45 and 0.5.

13. The device for the production of syngas according to claim 8, wherein the reaction chamber comprises a tubular reactor chamber having a diameter of from about 0.02 m to about 0.2 m or a length of at least 5 times the diameter.

* * * * *